United States Patent

[11] 3,576,413

| [72] | Inventors | John E. Creager<br>Fenton;<br>John A. Stewart, Flint, Mich. |
|---|---|---|
| [21] | Appl. No. | 881,543 |
| [22] | Filed | Dec. 2, 1969 |
| [45] | Patented | Apr. 27, 1971 |
| [73] | Assignee | General Motors Corporation<br>Detroit, Mich. |

[54] WASHER FLUID LOW LEVEL WARNING SWITCH
5 Claims, 3 Drawing Figs.

| [52] | U.S. Cl. | 200/84 |
|---|---|---|
| [51] | Int. Cl. | H01h 35/18 |
| [50] | Field of Search | 200/84,<br>84.3; 73/308, 322.5, 319 |

[56] References Cited
UNITED STATES PATENTS

| 2,236,360 | 3/1941 | Beam | 200/84.3(UX) |
| 2,495,149 | 1/1950 | Taylor | 200/84.3(UX) |
| 2,899,517 | 8/1959 | Hastings et al. | 200/84.3(UX) |
| 2,980,775 | 4/1961 | Crain | 200/84.3(UX) |
| 3,277,259 | 10/1966 | Beebe | 200/84.3(UX) |
| 3,293,579 | 12/1966 | Harper | 200/84.3(UX) |

Primary Examiner—David Smith, Jr.
Attorneys—F. J. Soucek and C. R. Engle

ABSTRACT: A windshield washer fluid low level indicator comprising a single magnet positioned between a pair of steel terminals and a steel spacer mounted on a float within a washer bottle. When the fluid level is above a predetermined height the steel spacer attracts the magnet to open a warning circuit, and when the fluid is below a predetermined level the steel terminals attract the magnet to close the warning circuit.

Patented April 27, 1971

3,576,413

INVENTORS
John E. Creager, &
BY John A. Stewart

F. J. Soucek

ATTORNEY

WASHER FLUID LOW LEVEL WARNING SWITCH

This invention relates generally to a fluid low level warning switch, and more particularly to a magnetically actuated switch contained in a vehicle windshield washer fluid container.

Most motor vehicles today are equipped with, or can be equipped with, windshield washers comprising a fluid container, pump and nozzles to direct cleaning fluid onto the windshields when it is desired to clean the windshields. The container and pump are positioned under the hood of the vehicle and the containers are periodically checked to make certain that there is sufficient cleaning fluid in the container at all times.

It is therefore an object of the present invention to provide means to warn the driver of a vehicle whenever the cleaning fluid reaches a predetermined low level without the necessity of raising the vehicle hood.

A further object of the present invention is to provide a magnetically actuated switch that is insertable in a fluid container, which switch actuates a warning circuit whenever fluid in the container falls below a predetermined level.

A further object of the present invention is to provide a magnetically actuated switch in a warning circuit wherein a single magnet is employed and is responsive in part to the terminals of the warning circuit.

The use of magnets to actuate terminals of warning systems is generally old, however, in accordance with the present invention a single magnet is attracted to the terminals to electrically short the terminals and complete a warning circuit in the event the condition to be measured is not met. When the condition is met, in this case when there is sufficient fluid in a container, a float carried steel member is caused to approach the magnet and draw it away from the terminals to open the warning circuit.

The above and other objects of the present invention will become obvious when the present specification is read along with the accompanying drawing wherein.

Figure 1:
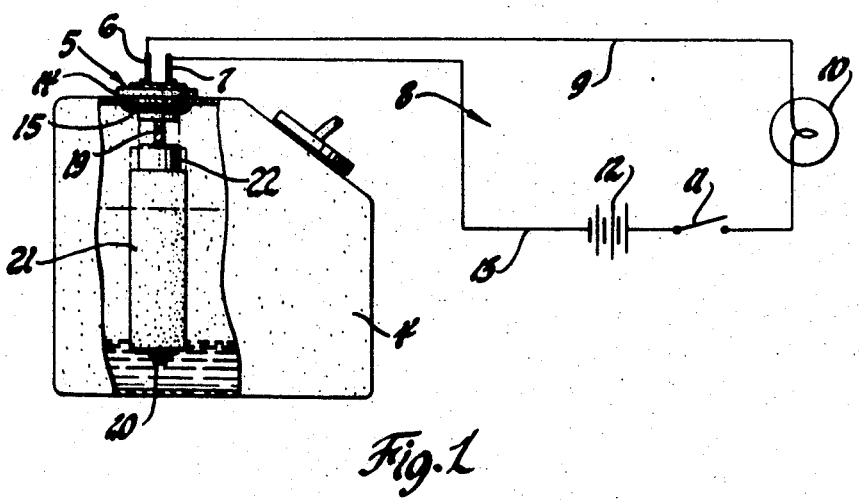
FIG. 1 is a circuit diagram incorporating the present invention.

Referring now to FIG. 1 a windshield washer fluid container 4 has positioned therein a magnetic switch 5 which includes contacts 6, 7 of switch 5. The contacts 6 and 7 are adapted to complete an electric warning circuit 8 including lead 9, light bulb 10, accessory switch 11, battery 12 and lead 13. It is apparent that bulb 10 may be a buzzer or other such type of warning device. It should be further apparent that switch 11 is closed only when the ignition switch (not shown) is in the "on," "start" or the "accessory" position.

Figure 2:
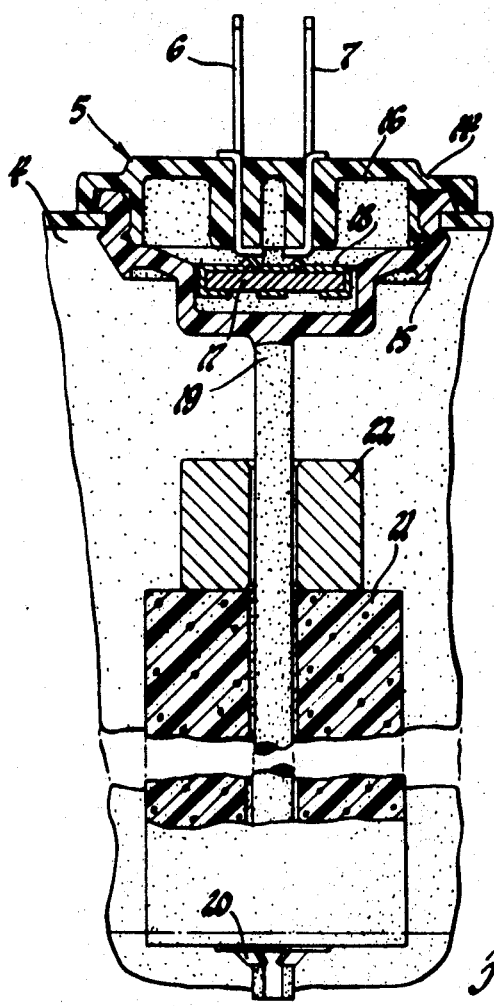
FIG. 2 is a partial elevational view in section of the present invention.
Figure 3:
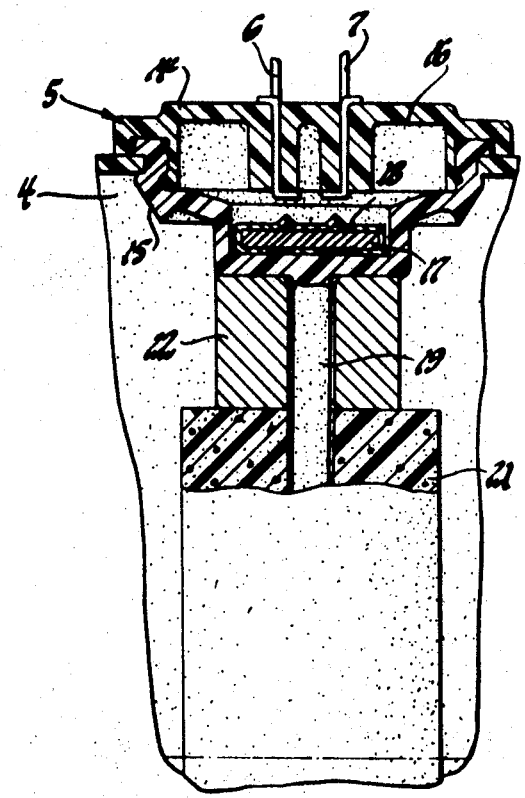
FIG. 3 is an enlargement of the top portion of FIG. 2.

Referring now to FIG. 2, the container or first housing 4 has a first closure 14 and a second closure 15 forming a second housing 16. Contacts 6 and 7, which are of substantially rigid steel or other magnetic material are molded or otherwise secured within closure 14 and extend therethrough into the housing 16. Within housing 16 and positioned between the upper and lower closures 14, 15 is a permanent magnet 17 encased by a conductive metal casing 18 which casing is preferably made of brass.

Integrally formed with closure 15 is a depending rod or shaft 19 having a stop or clip 20 at the lower end thereof. Slidably mounted on shaft 19 is a float member 21 and positioned on the float member is a spacer or ring 22 of steel or other magnetizable material. The extent of movement of the float 21 and spacer 22 is determined by the spacing between the lower surface of closure 15 and clip 20. By adjusting the position of clip 20 on rod 19 the amount of fluid remaining in container 4 when switch 5 is actuated may be predetermined. It is desirable to have a sufficient amount of fluid left in container 4 until the container can be refilled after the alarm circuit is actuated.

In operation when the fluid in container 4 is at a proper level the float 21 and the steel spacer 22 are moved upwardly into engagement with the closure 15. The steel spacer will abut the lower end of closure 15 and provide a magnetic path such that magnet 17 will be attracted downwardly to a position against the lower side of closure 15. In this position the current path between the terminals 6 and 7 is interrupted and the indicator lamp 10 is disconnected from the battery 12.

As the fluid in container 4 is used and the level in the container 4 falls below a predetermined level the float 21 and the spacer 22 move downwardly on shaft 19 away from closure 15. A magnetic path is now provided for magnet 17 by the steel terminals 6 and 7 and the circuit including lamp 10 is closed to indicate a low level of fluid.

While there has been shown and described a preferred embodiment of the present invention it is understood that minor changes may be made without departing from the spirit and scope of the invention as claimed.

We claim:

1. A low level warning switch for use in a windshield washer fluid container comprising a housing having an upper closure and a lower closure, a pair of contacts of magnetic material positioned in said upper closure and spaced from each other, said contacts being adapted to be connected to an electric circuit, a magnet within said housing movable between said upper and lower closures and adapted to electrically bridge said contacts, a shaft formed integrally with said lower closure and extending downwardly therefrom, a float slidably positioned on said shaft and a spacer of magnetic material positioned on said float, said spacer being adapted to abut said lower closure and provide a low reluctance path whereby said magnet is attracted toward said spacer to maintain said contacts open.

2. A low level warning switch as defined by claim 1 wherein said spacer comprises a steel ring slidably movable on said shaft above said float.

3. A low level warning switch as defined by claim 1 wherein said magnet is partially encased in a brass casing.

4. A low level warning switch as defined by claim 1 wherein a clip is positioned on said shaft below said float to limit the downward movement of said float.

5. A low level responsive switch for a fluid container, comprising in combination: a housing defining a cavity having a roof and a floor, the roof having a pair of spaced electrical contacts and being composed at least in part of material having low magnetic reluctance, an armature disposed in the cavity and including a permanent magnet and means to bridge said contacts when the armature is in lifted position, the armature and cavity having complementary shapes to register said means and said contacts when the armature is lifted, the strength of the magnet and the reluctance of the roof being so related to the mass of the armature as to lift the armature to contact-making position when the armature is free of bottoming force; a float disposed outside the cavity and within the container to rise and fall with liquid level therein, the float having low reluctance material at its top, the reluctance of the magnetic path thereby formed when the float is against the floor of the cavity being sufficiently low to arrest lifting of the armature and to withdraw the armature from elevated position, the attraction of the float and armature being insufficient to sustain the weight of the float in the absence of fluid support, the float and the container having guide defining conformations effective to confine the float to registered position in relation to the floor.